United States Patent Office 3,270,019
Patented August 30, 1966

---

3,270,019
THIAALKYL-SUBSTITUTED SPIRO (CYCLOHEX-ANE-1′,5-BARBITURATES)
William S. Friedlander, Hudson, Wis., and John R. Mattson, Maplewood, Minn., assignors to Minnesota Mining and Manufacturing Company, St. Paul, Minn., a corporation of Delaware
No Drawing. Filed Dec. 5, 1960, Ser. No. 73,540
3 Claims. (Cl. 260—257)

This invention relates to certain new and useful spiro [3′-acylmercaptomethyl-cyclohexane-1′,5 - (barbiturates)] and methods for making the same.

These new spirobarbiturates can be represented generically by the formula:

(1)
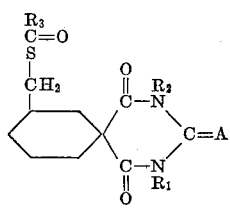

where $R_1$ and $R_2$ can be the same or different and are selected from the group consisting of hydrogen, lower alkenyl and lower alkyl, $R_3$ is lower alkyl and A is selected from the group consisting of oxygen and sulfur.

Compounds of Formula 1 form useful salts when $R_1$ is hydrogen. Thus, a generic formula for these salts can be written as follows:

(2)
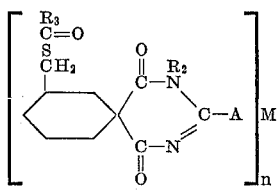

where $R_2$ is selected from the group consisting of hydrogen, lower alkenyl and lower alkyl, $R_3$ is selected from the group consisting of lower alkyl and A is selected from the group consisting of oxygen and sulfur, M is selected from the group consisting of alkali metals, alkaline earth metals, ammonium, and organic ammonium radicals, and $n$ is an integer greater than 0 less than 3 (i.e. 1 or 2) which number is equal to the valence of M in any given compound.

By the term "organic ammonium radicals" reference is had to mono, di, tri, and tetra-organo-substituted ammonium radicals, for example, tetramethylammonium, tetrabutylammonium, trimethylhexylammonium, diethyldibutylammonium, and the like. Other organo-substituted ammonium radicals are formed by reaction of a proton from a Formula 1 compound where $R_1$ is hydrogen with an organic base. Suitable organic bases include, for example, alkyl amines, such as methylamine, butylamine, dialkylamines such as dimethylamine, diethylamine, dihexylamine, trialkylamines, such as trimethylamine, tributylamine, as well as more complex primary, secondary and tertiary amines in which the amine groups bear complex substituents. Illustrative of this last type are such amines as phenyl-2-aminopropane, N-methyl-1-phenyl-2-aminopropane, ethanolamine, diethanolamine, 2-aminopyridine and naturally occurring synthetic alkaloids, such as ephedrine papaverine, aminophylline, theophylline and the like.

One preferred class of salts comprises those which contain the lower alkyl ammonium radical, i.e. those radicals containing up to four lower alkyl radicals bonded to a single nitrogen atom in a cation.

The term "alkali metal" has reference to those metals of Group I—A of the Periodic Table of the Elements such as lithium, potassium or sodium. The term "alkaline earth metals" has reference to those metals of Group II–A of the Periodic Table such as calcium and magnesium. The term "lower" as used before "alkyl" or "alkenyl" has reference to radicals which contain less than 7 carbon atoms each.

Preferred compounds of Formulas 1 and 2 above are those where $R_1$ and $R_2$ are both hydrogen, $R_3$ is methyl, and A is oxygen, and where M in Formula 2 is sodium.

The compounds of this invention are readily prepared by contacting diallylbarbituric acid, an N-lower-alkyl-substituted diallylbarbituric acid, or an N,N′-lower-alkyl-di-substituted diallylbarbituric acid with the appropriate thiolcarboxylic acid in the presence of a radical initiator all contained in a solvent or diluent. The overall reaction may be summarized as follows:

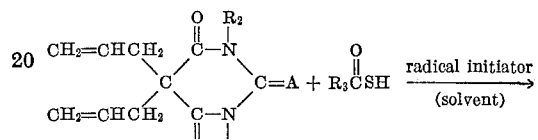

(3)   (4)

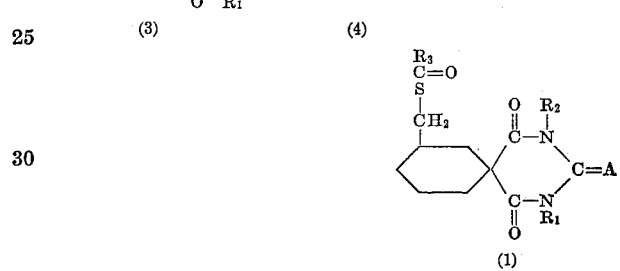

(1)

where $R_1$, $R_2$, $R_3$, M, $n$, and A have their previously defined meanings.

The term "free-radical initiator" or just "radical initiator" in this application is used in its conventional sense to have reference to catalytic-like materials capable of causing homolytic cleavage, as by thermal activation, of the compounds of Formula 4 above. Any suitable radical initiator known to the art can be used to initiate the reaction. Of course, variations in the degree of radical formation produced by a given initiator, or a combination of initiators, will be observed with any given set of reactants. As those skilled in the art will readily appreciate, radical initiators which are degraded or otherwise inactivated by compounds of Formula 4 obviously will not produce the desired reaction. Suitable radical initiators generally include, for example, such materials as benzoylperoxide, lauroyl peroxide, azobisisobutyronitrile, ditertiarybutylperoxide, dicumyl peroxide, actinic radiation such as ultraviolet light and the like.

In general, the reaction is carried out in a liquid diluent or solvent. The word "solvent" as used in this application is equivalent to the word "diluent" and does not necessarily indicate there is a true solution. The use of a solvent in the processes of this invention is incidental and not critical but offers the advantage of controlling reactions in which there is considerable exotherm. Usually a solvent which is inert over the range of reaction conditions involved is employed as the reaction medium. For reasons of availability, inert liquid hydrocarbons are preferred, such as benzene, hexane, pentane, heptane, toluene, and the like.

We prefer to employ at least an amount of solvent sufficient to permit mixing of reactants. Thus, we prefer to use an amount of solvent at least equal in weight to the combined weight of the reactants employed in any given reaction. More preferably, we use an amount of solvent equal to ten times the combined weight of the reactants employed although the amount of solvent actually employed for a given reaction is not critical.

Concerning quantity of the reactants employed (see Formulas 3 and 4, respectively, above) one can employ an excess of either class of starting material. Thus, one can employ a 20:1 molar ratio, or even greater, of one reactant to the other. However, from the standpoint of efficiency, approximate molar ratios from 1:1 to 2:1 of the compounds of Formula 4 to those of Formula 3 (i.e., slightly in excess of stoichiometric proportions) are preferred. Excess Formula 4 compounds may sometimes be used as a reaction medium.

The amount of chemical radical initiator employed for a given reaction can in general vary between wide limits. Usually one will employ at least about 0.001 to 1% of radical initiator based on the combined weight of reactants. Commonly, not more than about 3% of radical initiator will be employed based on combined weight of reactants. The optimum amount of radical initiator to be employed in any given reaction will of course vary from reaction to reaction, and it is not possible to give the exact amount for every given combination of reaction conditions and reactants. However, as those of ordinary skill in the art will appreciate, one will use an amount of radical initiator which is sufficient to cause a reaction to proceed. When ultraviolet light is used as the radical initiator, one will employ an amount of illumination as will induce compounds of Formula 4 to react with those of Formula 3.

In general, the reaction is conducted at room temperatures (i.e., about 20° C.) up to the reflux temperature of the particular diluent or solvent employed. We generally prefer to employ temperatures at or near reflux, but, as those skilled in the art will appreciate, the optimum reaction temperature for any specific reaction is that which will produce the greatest extent of reaction between the compounds. Reaction times are generally under 24 hours.

Extent of the reaction can be determined by observing the amount of barbituric acid starting material remaining in the reaction mixture at time intervals after reaction has been initiated. One convenient way we use is to employ a solvent such as benzene in which diallylbarbituric acid starting material is substantially insoluble under the reaction conditions and the products are soluble then we may visually observe the amount of unreacted barbituric acid starting material present in the reaction vessel.

If one desires to stop the reaction while a quantity of unreacted barbituric acid starting material is present in the reaction vessel, one can simply separate it from the liquid phase by filtration or even decantation. The products of the reaction can be isolated from the reaction mixture by conventional distillation and recrystallization techniques.

The starting materials of Formulas 3 and 4, respectively, can be prepared by any conventional means known to the art. Compounds of Formula 4 are commercially available as is diallylbarbituric acid. Diallylbarbituric acid itself can be used to prepare N-lower alkyl substituted derivatives by conventional alkylation procedures, see for example those described in Chemical Abstracts, 28, 2370 (1934), Chem. Abstract 27, 5085 (1933), Chem. Abstract 42, 573 (1948), Chem. Abstracts 44, 6525 (1950), Chem. Abstract 46, 3154 (1952). N-alkyl or N, N'-dialkyl derivatives of 5,5-diallylbarbituric acid can be made from the corresponding urea derivatives and diallylmalonic ester. N-allyl derivatives of compounds of Formulas 1 and 2 are made from the cyclized (spiro) product where $R_1$ is hydrogen and $R_2$ is as defined above. The presence of an alkenyl group on one or more of the nitrogen atoms of 5,5-diallylbarbituric acid starting material of Formula 3 can produce undesirable side reactions.

The metal and ammonium salts of Formula 2 are readily prepared from the appropriate free acidic compounds of Formula 1 by merely adding a selected compound of Formula 1 to an aqueous or alcoholic solution of an inorganic base containing the desired metal or ammonium cation. Similarly, to prepare amine salts, one simply adds the appropriate compound of Formula 1 to an alcoholic solution of the desired amine. Excess liquid then may be removed to leave the dry salt with customary care to avoid hydrolysis.

The compounds of this invention have a number of utilities. They are physiologically active. In Formulas 1 and 2, when $R_1$ is hydrogen, and $R_2$ is hydrogen or lower alkyl (other substituents remaining the same as defined), the compounds display hypnotic activity. When $R_1$ and $R_2$ in Formulas 1 and 2 are both alkyl (other substituents remaining the same as defined), the compounds are convulsants.

The compounds of Formula 1 have use as buffering agents, as where a specific pH must be maintained in an aqueous solution, for example, for in vitro physiological test purposes. They are effective in the range of about pH 7–9.

The salts of Formula 2 are particularly useful because of their water solubility especially in those situations where one desires aqueous solutions of the relatively insoluble compounds of Formula 1. For example, compounds of Formula 2 are useful for immobilizing aquatic animals such as fish. These compounds appear to exert tranquilizing effects on such animals. One can simply introduce a compound of Formula 2 into the aqueous environment of the animal(s) to be immobilized.

The compounds of this invention display plant growth regulant activity and have some fungicidal action.

The invention is further illustrated by reference to the following examples:

EXAMPLE I

*Spiro[3'-acetylmercaptomethyl-cyclohexane-1',5-(barbituric acid)]*

(A) Diallylbarbituric acid 20.8 g. (0.1 mole), thiolacetic acid 9.1 g. (0.12 mole) and 100 ml. of benzene are heated to reflux in a 500 ml. quartz flask exposed to a Hanovia U.V. lamp for 20–22 hours. The reaction mixture is cooled to room temperature and filtered. The filtercake is crystallized from EtOH giving a colorless product melting at 168.5° C.

Calculated for $C_{12}H_{16}N_2O_4S$: 50.7% C; 5.63% H. Found: 57.7% C; 5.6% H.

(B) Thiolacetic acid, 30.0 g.; 5,5-diallylbarbituric acid, 41.6 g. and 250 ml. benzene are refluxed in a quartz flask exposed to a Hanovia U.V. lamp for 16 hours. The solvent is then removed at reduced pressure. The residue is crystallized from EtOH, giving a product M.P. 167.5–8.5° C.

Calculated for $C_{12}H_{16}N_2O_4S$: 50.7% C; 5.6% H. Found: 50.8% C; 5.7% H.

EXAMPLE II

*Salts of spiro[3'-acetylmercaptomethyl-cyclohexane-1',5-(barbituric acid)]*

To a solution of 0.1 mole of the free acid in 100 ml. of absolute ethanol is added a solution of 0.1 mole of sodium hydroxide in 50 ml. of ethanol. The mixture is filtered and the filtrate is evaporated to dryness. The residue which consists of sodium spiro[3'-acetylmercaptomethyl-cyclohexane-1',5-(barbituric acid)] is dried under vacuum at about 50° C. for several hours.

The same procedure is followed using corresponding stoichiometric equivalents of potassium hydroxide, calcium hydroxide, magnesium hydroxide and ammonium hydroxide or a simple substituted ammonium hydroxide to prepare respectively, the K, Ca, Mg and ammonium salts of spiro[3'-acetylmercaptomethyl-cyclohexane-1',5-(barbituric acid)].

When an ethanol solution containing stoichiometric amounts of tetramethyl ammonium hydroxide and the same free acid is evaporated to dryness, there is obtained the tetramethyl ammonium salt of spiro[3'-acetylmercaptomethyl-cyclohexane1',5-(barbituric acid)].

EXAMPLE III

N-alkenyl-substituted derivatives of the compounds of Formula 1 where at least $R_1$ equals H are prepared by treating the corresponding sodium salt prepared as described in Example II and in the presence of a diluent with a stoichiometric amount of alkenyl bromide and heating the mixture over steam until the calculated amount of sodium bromide is obtained. The reaction mixture is filtered and the diluent removed at reduced pressure. The product is crystallized from benzene or other appropriate solvent. Thus the product spiro[3'-acetylmercaptomethyl - cyclohexane - 1',5 - (1 - allylbarbituric acid] is made.

The following examples presented in tabular form as Table I show the preparation of additional compounds of Formula 1. A ten mole percent excess of compounds of Formula 4 to compounds of Formula 3 is employed. The solvent is benzene in an amount equal to twice the combined weight of reactants, and the amount of radical initiator employed is about 1% based on combined weight of reactants. Reaction time is about 24 hours and the temperature is maintained at or near reflux, in each instance.

where $R_1$ and $R_2$ are selected from the group consisting of hydrogen, lower alkyl and lower alkenyl, $R_3$ is lower alkyl and A is a member of the group consisting of oxygen and sulfur and (II) a physiologically acceptable salt thereof with base.

3. In a process for preparing a compound of the formula:

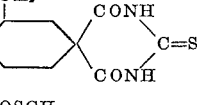

where $R_1$ and $R_2$ are selected from the group consisting of hydrogen, lower alkyl and lower alkenyl, $R_3$ is lower alkyl and A is a member of the group consisting of oxygen and sulfur, the step of reacting, in the presence of a radical initiator in an inert liquid hydrocarbon diluent, a compound of the formula:

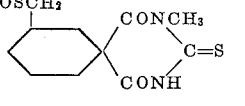

TABLE I

| Example No. | Substituents of compounds of Formula 3 | | | Substituent of compounds of Formula 4 | Catalyst | Product |
|---|---|---|---|---|---|---|
| | A | $R_1$ | $R_2$ | $R_3$ | | |
| IV | O | H | H | n-$C_3H_7$- | U.V. | n-$C_3H_7$COSCH$_2$ 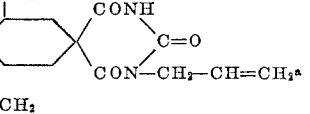 |
| V | S | H | H | $CH_3$- | U.V. | $CH_3$COSCH$_2$ 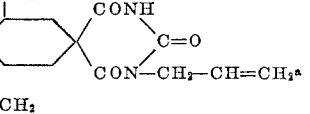 |
| VI | S | $CH_3$ | H | n-$C_5H_{11}$- | Benzoylperoxide | n-$C_5N_{11}$COSCH$_2$ 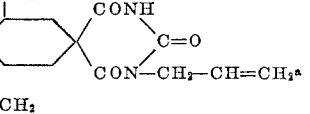 |
| VII | O | H | H | $CH_3$- | U.V. | $CH_3$COSCH$_2$ 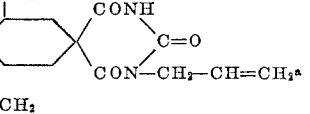 |
| VIII | O | $CH_3$ | $CH_3$ | $CH_3$- | U.V. | $CH_3$COSCH$_2$ 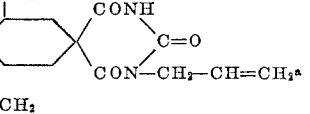 |
| IX | O | $CH_3$ | $CH_2$=CH—$CH_2$- [a] | $CH_3$- | U.V. | $CH_3$COSCH$_2$ 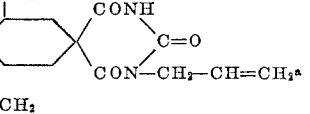 |

[a] Allyl groups are added after cyclization.

The claims are:

1. Spiro[3' - acetylymercaptomethyl - cyclohexane-1',5-(barbituric acid)].

2. A member selected from the group consisting of:
(I) a compound of the formula:

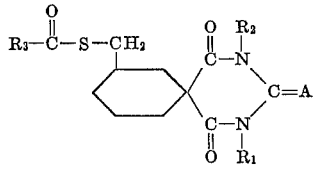

where $R_1$, $R_2$ and A have the above significance with a compound of the formula:

$R_3\overset{O}{\overset{\|}{C}}SH$ where $R_3$ has the above significance.

(References on following page)

References Cited by the Examiner

UNITED STATES PATENTS 2,725,380  11/1955  Cope _____ 260—260
2,764,585  9/1956  Lee et al. _____ 260—257

OTHER REFERENCES

Cope et al.: J. Am. Chem. Soc., vol. 71, pp. 3658–3662 (1949).

Morton: The Chemistry of Heterocyclic Compounds, p. VI of the preface (1946).

HENRY R. JILES, *Acting Primary Examiner.*

IRVING MARCUS, NICHOLAS S. RIZZO, *Examiners.*

J. W. ADAMS, JR., *Assistant Examiner.*